UNITED STATES PATENT OFFICE.

FRANZ VON KÜGELGEN, OF HOLCOMBS ROCK, VIRGINIA, AND GEORGE O. SEWARD, OF EAST ORANGE, NEW JERSEY, ASSIGNORS TO VIRGINIA LABORATORY COMPANY, OF NEW YORK, N. Y., A CORPORATION OF NEW YORK.

PRODUCTION OF ALUMINUM CHLORID.

1,147,832.      Specification of Letters Patent.      Patented July 27, 1915.

No Drawing.      Application filed November 26, 1913. Serial No. 803,206.

*To all whom it may concern:*

Be it known that we, FRANZ VON KÜGELGEN, a subject of the Emperor of Germany, residing at Holcombs Rock, in the county of Bedford and State of Virginia, and GEORGE O. SEWARD, a citizen of the United States, residing at East Orange, in the county of Essex and State of New Jersey, have jointly invented certain new and useful Improvements in the Production of Aluminum Chlorid, of which the following is a specification.

This invention relates to the production of aluminum chlorid from clay or bauxite, which are the cheapest raw materials available. The production from such materials, and by a cheap process, of aluminum chlorid, would render practicable the production of aluminum by the electrolysis of such chlorid.

The invention also affords a means for the refining of clay or bauxite or analogous material by removing the iron or iron compounds contained therein. It also provides a means for separating aluminum and silicon in materials where the oxids or compounds of these elements are associated.

Aluminum chlorid has heretofore been produced according to the method of Deville, by mixing alumina with carbon and a suitable binder, forming briquets, and treating them in a retort with chlorin. Since pure alumina was used for this purpose, pure aluminum chlorid was formed. Gin (*Electromet. Ind.* April 1904) applied this method to bauxite. He got a chlorid which was contaminated with all the iron which was present in the bauxite, and also some silicon, and in a special receiver silicon tetra-chlorid. The latter was decomposed into $SiO_2$ and $HCl$ by steam. The raw material according to this method is mixed with enough carbon to reduce all the constituents of the bauxite.

We have found that the chlorin has a decidedly selective action on the constituents of bauxite and clay and a long series of experiments showed us that the chlorination can be conducted so that the constituents are chlorinated one after the other and silica left behind. In the ores of alumina the main constituents are iron oxid, alumina and silica. Titanium is present but in small quantities.

As the chlorination is carried on, first the iron will be chlorinated leaving the alumina and silica practically untouched. A deficiency of reducing material may assist this reaction. If then the chlorination is interrupted we get the iron traces formed into chlorid without materially attacking the alumina. The condenser can be changed then or we may remove the material into another chlorination furnace, where the chlorination is resumed. Now alumina is chlorinated and the silica is left behind, if the chlorination is stopped at the right time.

In experimenting with bauxite and kaolin and also with the different oxids we found that the selective action of chlorin can be materially assisted by a regulation of temperature during the chlorination. We found the following facts:

(*a*) Iron oxid mixed with carbon was appreciably chlorinated at 300° C., but the action was slow. At 400° C. a perfect chlorination took place.

(*b*) Silica mixed with carbon was not chlorinated between 400° and 800°. At 900° a treatment of two hours chlorinated only 1%.

(*c*) Aluminum oxid mixed with carbon was scarcely chlorinated at all at 400°. The chlorination started at 500°. The reaction was quickened as the temperature rose, and at 900° was substantially complete.

(*d*) Titanium oxid mixed with carbon is chlorinated very slowly at 500° and at 700° is completely chlorinated.

It is not only the selective action of the chlorin but the temperature which allows it to chlorinate one constituent of the ore, while the other remains practically untouched.

The process of chlorination of bauxite or clay is conducted therefore as follows:—We heat the material mixed with reducing material at a temperature between 300° and 450°. During this period iron is chlorinated and its chlorid caught in a receiver, while the other ingredients remain practically untouched. We then heat up the furnace to 900°, whereby all the iron chlorid which was not driven over to the receiver, will be volatilized. Then we change the receiver and start the chlorin again, whereby the chlorination of alumina commences. The titanium will be chlorinated too, but being so much more volatile than the aluminum chlorid, is caught separately. It is advisable not to try to exhaust the bauxite or clay of alumina, but the limitation of temperature at 900° helps materially to leave the silica untouched.

Instead of changing the receiver it may be desirable to have two different furnaces, which are kept at different temperatures. In that case, when the chlorination of iron is over, the material is removed into the other chlorination furnace, where the temperature is kept at 900°.

The process described above could be conducted in retorts heated externally, but the fact that the outside of the vessel must be kept hotter than the material itself, does not allow a long life for the apparatus, the retort being deteriorated rapidly. We propose to use either a large vessel which is heated internally by electricity, or, to introduce with the chlorin air, for which carbonaceous material is provided in the interior of the apparatus, and cause the burning of this material by the air to furnish the heat necessary to keep the reaction going.

We use either dilute chlorin, such as is obtained in the electrolytic decomposition of chlorids when the electrolytic furnace is not kept tightly closed, so that air is mixed with the chlorin; or we introduce the air separately. In the latter case we may introduce it simultaneously with the chlorin or at intervals. We may introduce it also at a different place than the chlorin. The main object with this kind of chlorination is to create heat in the material itself without seriously heating the walls, and this is best done by introducing air into the material and providing carbonaceous fuel to be burned by the air. As the fuel we may use either a solid material or gas.

We have used in practice intermittent heating. We interrupted the chlorin introduction during the internal heating, and we also stopped the heating while the chlorin was applied. This was done in order to have the chlorin as concentrated as possible. We found it very desirable to preheat the chlorin.

If in the practice of the process a small amount of silicon chlorid should be found (which is always likely to occur to a minute extent), and should be carried over with the aluminum chlorid, the product can be washed with carbon tetrachlorid which will entirely dissolve out such traces of silicon chlorid. It is possible also that in some cases traces of titanium chlorid may be found in the product, and these may be eliminated by the same washing with carbon tetrachlorid.

A suitable manner of conducting the process is the following:—Place the clay or bauxite in small pieces in a tower and heat by either externally- or internally-applied heat until the moisture is eliminated; then introduce chlorin either alone or with some reducing gas. The iron is chlorinated and driven out as chlorid with perhaps a small amount of aluminum chlorid. Then the hot mass of bauxite is discharged into another apparatus and there is quickly mixed with it sufficient hot carbonaceous material as to reduce alumina, but not silica. Care must be taken to have a good enough mixture and at the same time not to lose any heat generated by its previous treatment. In the second apparatus we have to add enough heat to keep the reaction going. As the reaction is exothermic, much heat is not required, but we have to supply enough to keep the material at bright red heat.

Another way of effecting the selective action of chlorin on the constituents of bauxite or clay would be to form briquets of the material with enough carbon to reduce alumina and iron oxid. The purification of the raw material would be effected then so that the reaction in the first tower is interrupted as soon as the chlorination of iron is over. In this case we would get some $AlCl_3$ with the $FeCl_3$, which must be afterward separated from it in a distinct apparatus. The temperature must be regulated as pointed out above. The material freed from iron will be dumped then directly into the second tower, where the real chlorination begins. In this case a mixing with carbon is not necessary, since the briquets have the materials in the right proportion and the chlorination can proceed at once after the material is transferred from one apparatus to the other.

The process provided by our invention is susceptible of considerable modification or variation in its performance. It will be understood that the carbonaceous or other reducing agent employed serves in the case of heating by internal combustion two functions, namely, that of reducing first the iron oxid or compound and then the aluminum oxid or compound, and secondly, as a fuel the combustion of which occasions internal generation of heat; and that the first of these functions requires a restriction or deficiency of the reducing material in order to limit the process to the reduction of iron and alumina, while the second requires an excess of reducing agent or fuel beyond that required for the performance of the first function. The desired result may be attained by controlling the process rather than by the preliminary determination of the precise amount of reducing agent; that is to say, by varying the admission of air the proportion of reducing agent burned as fuel may be controlled so that, while an ample excess of carbonaceous material to provide for the fuel requirement may be introduced, yet toward the end of the process a desirable deficiency of the reducing agent may be attained by insuring the burning-out of the entire excess thus provided. The reducing material may be introduced either in solid form or as a liquid which may be sprayed into the vessel, or as a gas, or partly in one form and partly in another. Instead of using a tower as the chlorination chamber, the latter may be like any of the numerous horizontal roasting furnaces.

What we claim is:—

1. In the production of aluminum chlorid from bauxite or clay, subjecting the raw material to a partial chlorination at a temperature below 500° to remove iron.

2. The production of aluminum chlorid from bauxite or clay by subjecting the raw material to a partial chlorination while heating to a temperature of approximately 900° C. substantially as described.

3. The production of aluminum chlorid from bauxite or clay by subjecting the heated material to the influence of chlorin first at a temperature below 500° C. to remove iron and then to a temperature of approximately 900° C. to separate alumina from silica.

4. The production of aluminum chlorid, by mixing the raw material with sufficient carbonaceous material to reduce compounds of iron and aluminum, but not silicon, removing iron by subjecting the raw material while heated to a temperature below 500° C. to the action of chlorin for a limited time, until the iron is eliminated, and then treating the product at a temperature approximating 900° C. with chlorin until the alumina is converted into chlorid.

5. The process which consists in mixing clay or bauxite with sufficient carbonaceous material to reduce compounds of iron and aluminum, heating the material to a temperature below about 500° C. in the presence of chlorin until the iron is eliminated, then removing to another apparatus and heating to a temperature approximating 900° C. in the presence of chlorin to produce aluminum chlorid.

6. The process which consists in heating clay or bauxite mixed with a reducing agent to a temperature below 500° C. in presence of chlorin until iron is substantially eliminated.

7. The process which consists in heating clay or bauxite mixed with a reducing agent in presence of chlorin at a temperature below 500° until iron is substantially eliminated.

8. The production of aluminum chlorid from bauxite or clay by subjecting the raw material to a partial chlorination with a reducing agent while heating it to a suitable temperature substantially as described.

9. In the production of aluminum chlorid by chlorination, internally supplying the necessary heat for the chlorination by introducing air and an equivalent proportion of fuel to cause combustion inside of the apparatus.

10. In the production of aluminum chlorid by chlorination, internally supplying the necessary heat for the chlorination by an excess of reducing agent beyond what is necessary for the partial chlorination, and introducing air enough to burn such excess, to maintain a temperature approximating 900° C.

11. The production of aluminum chlorid by mixing with the raw material a carbonaceous reducing agent, heating the material in the presence of chlorin, introducing air whereby to burn a portion of such carbonaceous material and thereby internally heat the mass, and discontinuing the process after the production of aluminum chlorid diminishes and before the material production of silicon chlorid.

12. The production of aluminum chlorid by chlorinating a mixture of bauxite or clay with carbon and intermittently heating the furnace internally by burning fuel inside by introducing air in alternation with the chlorin substantially as described.

In witness whereof, we have hereunto signed our names in the presence of two subscribing witnesses.

FRANZ von KÜGELGEN.
GEORGE O. SEWARD.

Witnesses:
CHARLES K. FRASER,
FRED WHITE.